No. 609,255. Patented Aug. 16, 1898.
W. H. WALDRON.
AXLE.
(Application filed Feb. 24, 1898.)
(No Model.)
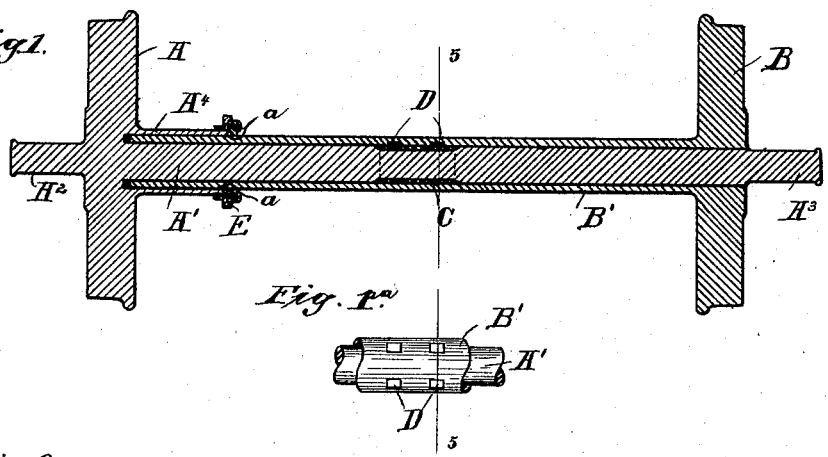
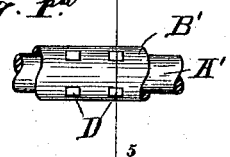
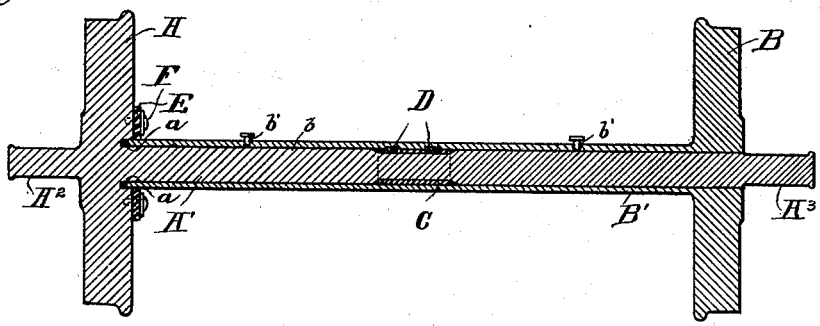
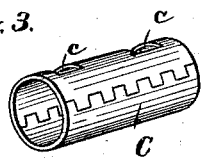
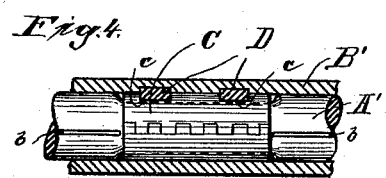
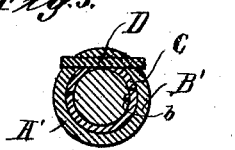
WITNESSES:
R. H. Newman.
M. F. Boyle
INVENTOR
William H. Waldron
BY
Thomas Drew Stetson
ATTORNEY.
THE NORRIS PETERS CO., PHOTO-LITHO., WASHINGTON, D. C.

UNITED STATES PATENT OFFICE.

WILLIAM H. WALDRON, OF NEW YORK, N. Y.

AXLE.

SPECIFICATION forming part of Letters Patent No. 609,255, dated August 16, 1898.

Application filed February 24, 1898. Serial No. 671,431. (No model.)

*To all whom it may concern:*

Be it known that I, WILLIAM H. WALDRON, a citizen of the United States, residing in the city of New York, borough of Manhattan, in the State of New York, have invented a certain new and useful Improvement in Axles, of which the following is a specification.

I will describe the invention as applied to the axle of a railroad-car having wheels and bearings arranged in the ordinary manner.

My improved axle is of the class which allows one wheel to revolve independently of the other. The improvement relates to the construction of the parts adjacent to and between the wheels. It gives great strength and firmness with small expense for material or construction. It may be made lighter than the ordinary devices for this purpose. It gives an efficient bearing for the end thrust, provides efficiently for the exclusion of dust, and allows of being readily applied and taken apart when required.

I provide for carrying special brake-wheels or dynamos or other mechanism to work on each wheel independently.

The accompanying drawings form a part of this specification and represent what I consider the best means of carrying out the invention.

Figure 1 is a central longitudinal section. Fig. 1ª is a fragmentary view of a portion of the axle and sleeve keyed thereon. Fig. 2 is a section corresponding to Fig. 1, showing a modification. The remaining figures are on a larger scale. Fig. 3 is a perspective view with a portion removed. Fig. 4 corresponds to Fig. 3. It is a section through the outer sleeve and keys with an elevation of the associated parts. Fig. 5 is a cross-section on the line 5 5 in Figs. 1 and 1ª.

Similar letters of reference indicate corresponding parts in all the figures where they appear.

A and B are the wheels, which may be of the ordinary size and thickness. A' is an axle keyed or otherwise firmly fixed in the wheel A and extending quite across the structure, with journals $A^2$ $A^3$ at the ends, respectively. The wheel B fits tightly, but with capacity to turn, on the portion of the axle A within it. A sleeve B' extends from the inner face of the wheel B quite across to the wheel A, and its extreme end is received in a corresponding circular groove $a$ in the wheel A, concentric to and near the surface of the axle A'. The sleeve B' is formed integral with the wheel B or is bolted or otherwise stiffly secured to such wheel.

I reduce the diameter of a sufficient portion near the mid-length of the axle A' and cast in place or otherwise match therein a corresponding sleeve C, which may fit tightly, but with lubrication will allow of turning around at a different rate from the axle within it. The exterior of this sleeve C is flush with the surface of the axle A' and receives the sleeve B' smoothly, making a fair fit, but with liberty to turn. After the parts are in place the short sleeve C is firmly secured to the longer inclosing sleeve B' by means of one or more keys D, driven through holes previously prepared in the outer sleeve and extending through corresponding scores $c$, planed or otherwise produced in the short sleeve C. I have represented two of these keys, with corresponding provisions for their reception; but one may suffice, or three may be used, if preferred.

I provide in the sleeve B', near each side, an oil-hole $b'$, which may be closed by a screw-plug or other plug after the lubricating material has been introduced, communicating with a groove $b$, which extends longitudinally of the axle A' and insures that lubricating material thus introduced may reach all the interior of the sleeve and also to the joint between the short sleeve C and the axle, which it incloses and against which its ends are shouldered. The shoulders are rounded to avoid any reëntering angle. This promotes the strength.

My axle may be carried in the ordinary bearings and used in all respects in the ordinary manner, with the advantage that the wheels may travel at different rates in traversing curved portions of the track. It will be understood that the difference of motion between the sleeves and the axle occurs only in traversing curves and is never great. The lubricating material may have much consistence or body and be applied at long intervals.

The sleeve B' does not reach quite to the bottom of the groove $a$, in which it is received in the wheel A. The interval between its smoothly-finished end and the bottom of the groove or annular recess $a$ is occupied by a ring of leather, felt, or the like, which makes a packing to completely exclude dust.

$A^4$ is a short sleeve fast on the wheel A, concentric to the long sleeve B'. When it is desired to apply separate brake-wheels, one is applied on the sleeve B' and the other on the sleeve $A^4$. So if it is required to apply dynamos to act on each wheel the dynamo or a gear-wheel connected therewith is correspondingly applied, one on the sleeve B', adjacent to the wheel B, and the other on the short sleeve $A^4$, adjacent to the wheel A. The braking force applied through brake-wheels thus conditioned or the impelling force applied through dynamos thus conditioned is felt equally by each wheel A and B.

Modifications may be made without departing from the principle or sacrificing the advantages of the invention. The sleeve B' may be thicker or thinner at the middle than at the ends to give a uniform surplus of strength at each point in the length. I can dispense with the short sleeve $A^4$ and drive the car efficiently by the traction of one wheel alone. The short sleeve C may be further shortened and receive only one key D.

When the sleeve $A^4$ is omitted, I can use an additional packing-ring E, which may be vulcanized rubber secured on the inner face of the wheel A by screws F, as indicated in Fig. 2. This packing-ring engages tightly with the outer surface of the adjacent portion of the long sleeve B'. I prefer the whole as shown.

I claim as my invention—

1. In combination with the wheel A having a concentric recess contiguous to its junction with the axle which it rigidly carries, said axle being provided with an intermediate recess and extended channels $b$, leading thereto, the shouldered portions of the axle forming the intermediate recess being rounded as described, of a wheel B rigidly carrying an extended sleeve embracing said axle and having its end extending into the concentric recess of the wheel A, said sleeve having an intermediate transverse opening and suitable stopped openings the latter communicating with the channels $b$, a stuffing-box for protecting the end of the sleeve and the concentric recess, a short sleeve within the axle-recess and perforated as described, and a key for engaging the transverse openings in the long and short sleeves, substantially as specified.

2. In combination with the wheel A having a concentric recess contiguous to its junction with the axle which it rigidly carries, said axle being provided with an intermediate recess and extended channels $b$ leading thereto, of a wheel B, rigidly carrying an extended sleeve embracing said axle and having its end extending into the concentric recess of the wheel A, said sleeve having an intermediate transverse opening and suitable stopped openings, the latter communicating with the channels $b$, a stuffing-box for protecting the end of the sleeve and the concentric recess, a short sleeve within the axle-recess and perforated as described, and a key for engaging the transverse openings in the long and short sleeves, substantially as herein specified.

In testimony that I claim the invention above set forth I affix my signature in presence of two witnesses.

WILLIAM H. WALDRON.

Witnesses:
OWEN WARD,
C. R. COMÉS.